United States Patent [19]
Downham

[11] Patent Number: 6,058,903
[45] Date of Patent: May 9, 2000

[54] ENGINE ENCLOSURE

[75] Inventor: David Downham, Flitwick, United Kingdom

[73] Assignee: Caterpillar Inc., Peoria, Ill.

[21] Appl. No.: 09/211,611

[22] Filed: Dec. 15, 1998

Related U.S. Application Data

[60] Provisional application No. 60/068,078, Dec. 18, 1997.
[51] Int. Cl.[7] .................................................. B62D 65/00
[52] U.S. Cl. .................................. 123/198 E; 123/195 R; 123/195 C; 180/68.1; 180/69.2
[58] Field of Search .......................... 123/198 E, 195 R, 123/195 C; 180/69.2, 68.1

[56] References Cited

U.S. PATENT DOCUMENTS

| | | | |
|---|---|---|---|
| 4,327,680 | 5/1982 | Dauwalder | 123/195 C |
| 4,721,070 | 1/1988 | Tanaka et al. | 123/2 |
| 5,303,792 | 4/1994 | Shimizu | 180/89.17 |
| 5,715,615 | 2/1998 | Murakami et al. | 37/379 |
| 5,826,440 | 10/1998 | Okada et al. | 62/239 |
| 5,928,535 | 7/1999 | Trinkner et al. | 219/133 |
| 5,975,833 | 11/1999 | Yamada et al. | 414/687 |

OTHER PUBLICATIONS

Kubota KX–2 Series Excavators brochure; Kubota Tractor Corporation; KX2001 Nov. 1996.

*Primary Examiner*—Noah P. Kamen
*Assistant Examiner*—Hai Huynh
*Attorney, Agent, or Firm*—John J. Cheek

[57] ABSTRACT

An engine enclosure for a work machine comprises a firewall, left and right-hand side panel structures, and a pivotal hood. Each set of side panel structures is supported by a support tower connected between the frame of the machine and a side margin of the firewall. The support towers are specially shaped to generally conform to the general shape of the panel structures they support. The hood is provided with a hold-open support which maintains the hood in an open position if so desired.

7 Claims, 3 Drawing Sheets

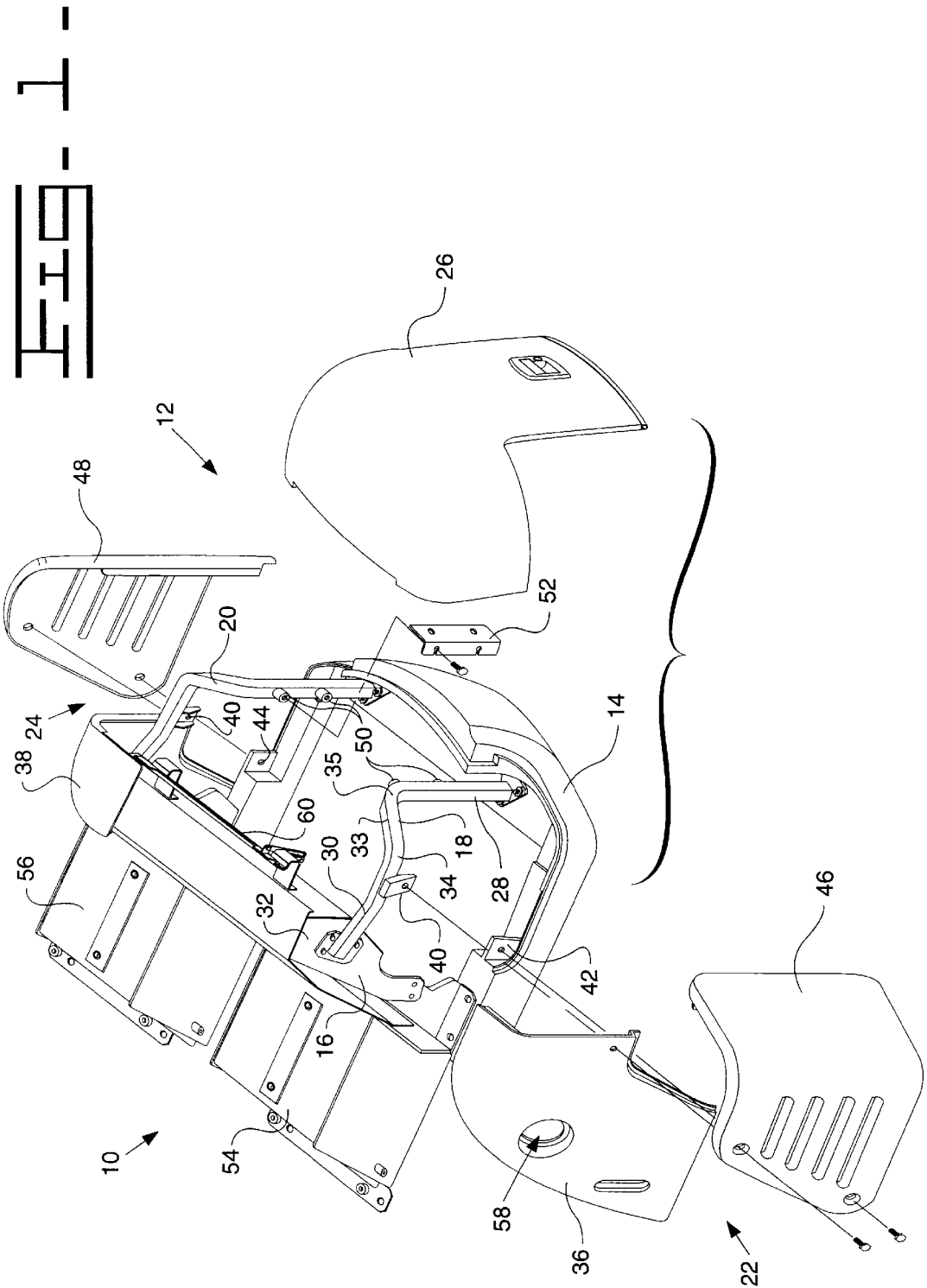

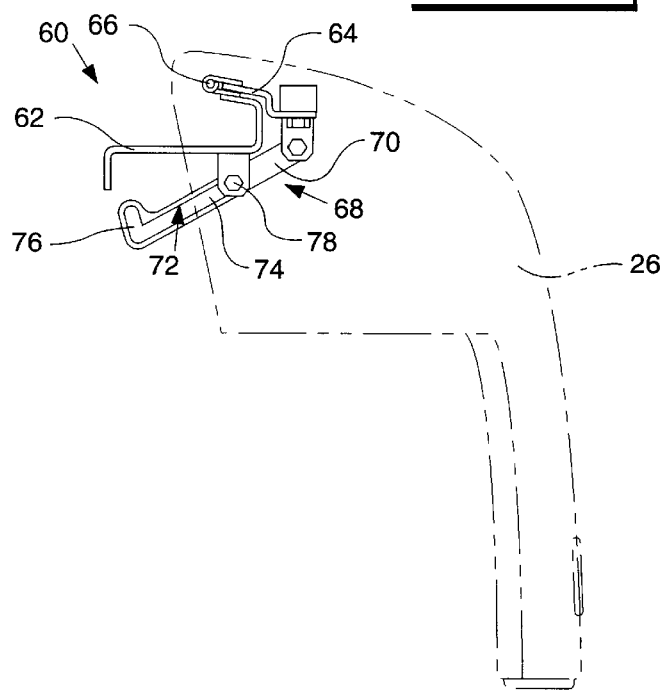
Fig-2-
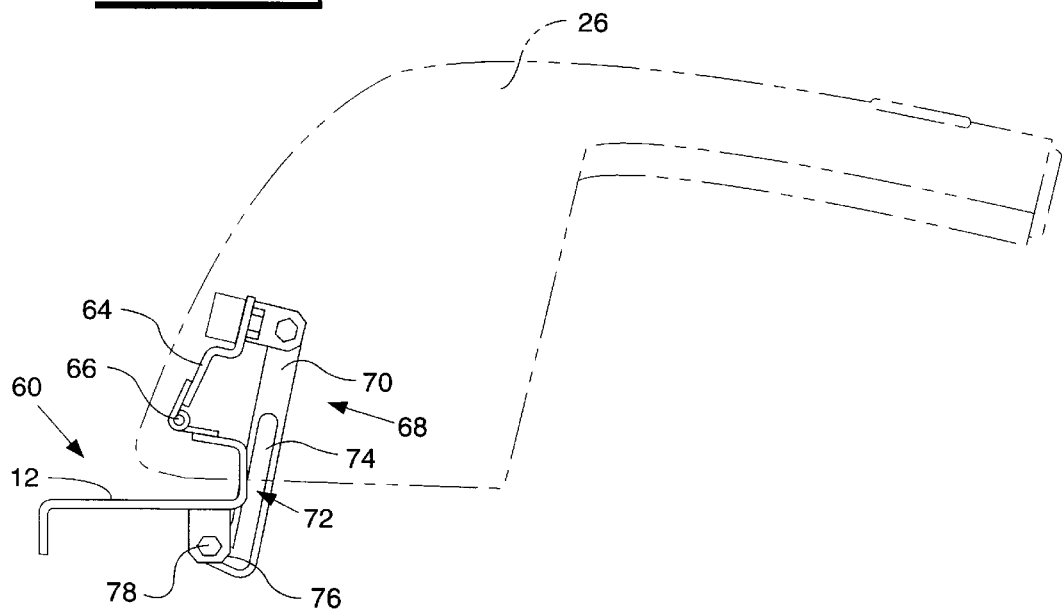
Fig-3-

ENGINE ENCLOSURE

This application claims the benefit of prior provisional application Ser. No. 60/068,078 filed Dec. 18, 1997.

TECHNICAL FIELD

This invention relates generally to an engine enclosure for a work machine.

1. Background Art

Work machines, such as small-sized hydraulic excavators, are typically powered by an engine mounted to the rear of the machine frame. The engine is bounded by a firewall, various side panels, and a pivotal hood. The side panels are suitably secured to supports mounted to the frame. To better support the panels, there is a need for a supports that better conform to the shape of the panels to be supported.

2. Disclosure of the Invention

In accordance with this invention, an engine enclosure for a work machine having a frame comprises an upstanding firewall mounted to the frame and having first and second opposed side margins. A first support tower has a first, upstanding portion and a second substantially longitudinally-extending portion, with the first portion of the first support tower being mounted to the frame at a location spaced longitudinally from the firewall and laterally inwardly from the first side margin of the firewall. The second portion of the first support tower is mounted to the firewall at an elevated location adjacent the first side margin of the firewall. The first and second portions of the first support tower are joined by an intermediate portion which extends upwardly and laterally outwardly from the first portion of the first support tower to the second portion of the first support tower. A second support tower has a first, upstanding portion and a second substantially longitudinally-extending portion, with the first portion of the second support tower being mounted to the frame at a location spaced longitudinally from the firewall and laterally inwardly from the second side margin of the firewall. The second portion of the second support tower is mounted to the firewall at an elevated location adjacent the second side margin of the firewall. The first and second portions of the second support tower are joined by an intermediate portion which extends upwardly and laterally outwardly from the first portion of the second support tower to the second portion of the second support tower. First panel structure is mounted to the first support tower, and second panel structure is mounted to the second support tower. A hood is mounted to the firewall and extends between the first and second panel structures.

BRIEF DESCRIPTION OF THE DRAWINGS

FIG. 1 is a partially-exploded perspective view of a fragment of a work machine having an engine enclosure in accordance with this invention.

FIGS. 2 and 3 are side-elevational views of a portion of a hood assembly forming a part of the engine enclosure shown in FIG. 1

BEST MODE FOR CARRYING OUT THE INVENTION

Figure 4:
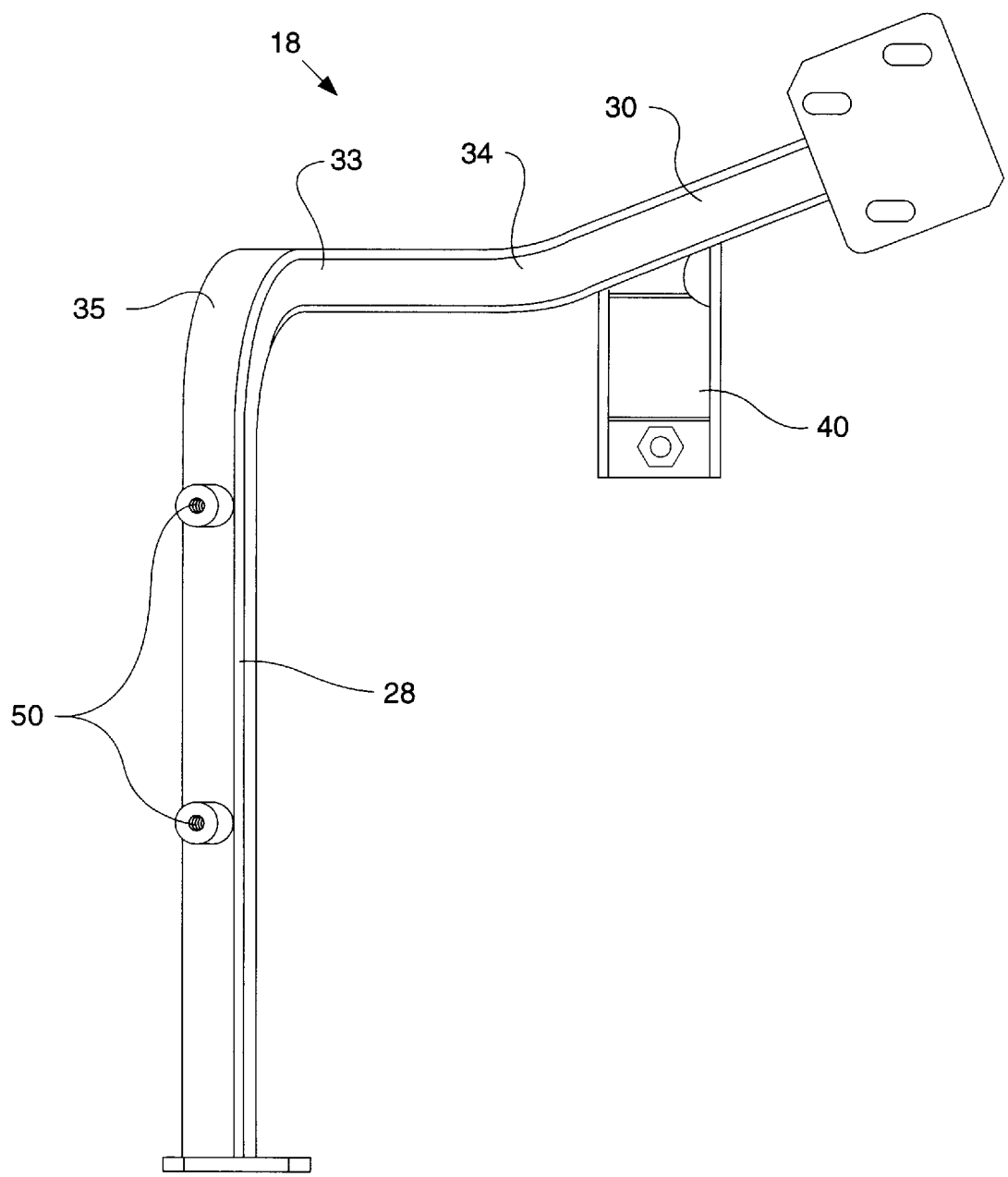
FIG. 4 is a side elevation of a support tower forming part of the engine enclosure illustrated in FIG. 1.

FIG. 1 illustrates a fragmentary portion of a work machine 10, such as a small-sized hydraulic excavator, and an engine enclosure therefor, generally designated 12, in accordance with this invention. The work machine 10 comprise a tub-like frame 14, only a portion of which is shown in FIG. 1, which carries the work implements, operator cab, tracked undercarriage and the like (not shown) of the machine 10. An engine (not shown), which propels the machine 10 and drives its hydraulic systems, is mounted at the rearward end of the frame 14 and enclosed by the engine enclosure 12. Because the details of the operative components carried by the frame 14 are not necessary to an understanding of this invention, they are not described further herein.

The engine enclosure 12 comprises an upstanding firewall 16 and left and right tubular support towers 18, 20. The firewall 16 is bolted to the frame 14 at a location spaced inwardly from the rear end of the frame 14. Each of the support towers 18, 20 is bolted at one end to the corresponding side of the firewall 16 and at its opposite end to the frame 16. Left and right panel structures, generally designated 22 and 24, are mounted to the corresponding support towers 18, 20, and a pivotal hood 26 is mounted to the firewall 16. The firewall 16, the panel structures 22, 24, and the hood 26 cooperate to substantially enclose the engine (not shown) of the machine 10.

As will be described below, the tubular support towers 18, 20 are configured to conform generally to the shape of the panel structures 22, 24 which they support. Because the support towers 18, 20 may be substantial mirror images, only the left support tower 18 is described in further detail herein, it being understood that the right support tower 20 is substantially a mirror image thereof, both in configuration and its mounting to the frame 14 and firewall 16.

With reference to FIGS. 1 and 4, the support tower 18, which is preferably a one-piece tubular member, has a first, upstanding portion 28 and a second substantially longitudinally-extending portion 30, with the first portion 28 being bolted to the frame 14 just forward of the rear end thereof at a location spaced laterally inwardly from the left side margin 32 of the firewall 16. The second portion 30 of the support tower 18 is bolted to the left side margin 32 of the firewall 16 at an elevated location. The first and second portions 28, 30 of the support tower 18 are joined by an intermediate portion 33 which extends upwardly and laterally outwardly from the first portion 28 of the support tower 18 to the second portion 30 of the support tower 18. The intermediate portion 33 is preferably joined to the first and second portions 28, 30 of the support tower 18 by arcuate corner portions 34, 35, as shown in FIGS. 1 and 4.

Left and right side panels 36, 38 are bolted to brackets 40 welded to the respective left and right support towers 18, 20. The side panels 36, 38 are also bolted to corresponding flanges 42, 44 on the frame 14. Curved corner protector panels 46, 48, which wrap around the rear corners of the machine 10, are also bolted to the support towers 18, 20 and to the frame 14. As shown in FIGS. 1 and 4, each support tower 18, 20 has a pair of raised bosses 50 projecting inwardly from the first, upstanding portion 28 thereof. Each pair of bosses 50 has a bracket 52 (only one of which is shown) mounted thereto, and the corner protector panels 46,48 are bolted to their respective bracket 52. As apparent from FIG. 1, the corner protector panels 46, 48 engage flanges on the side panels 36, 38, respectively, to help hold the side panels 36, 38 in position. Here, it may be noted that the hood 26, the side panels 36, 38, and the corner protector panels 46, 48 are preferably formed from a durable non-metallic material.

With reference particularly to FIG. 1, a pair of tanks 54, 56 is mounted to the frame 14 just ahead of the firewall 16.

The left-side tank 54 is preferably a fuel tank, and the left side panel 38 is provided with an opening 58 to receive a fuel fill tube (not shown) leading to the tank 54. The right-side tank 56 is preferably a hydraulic fluid tank for use with the hydraulic systems (not shown) of the machine 10. Although not illustrated, the tanks 54, 56 can advantageously support the operator seat of the machine 10.

Referring also to FIGS. 2 and 3, the hood 26 is mounted to the firewall by a hinge assembly, generally designated 60. The hinge assembly 60 comprises a first member 62 bolted to the firewall 16 and a second member 64 bolted to the hood 26. The hinge members 62, 64 are joined by a hinge pin 66, which permits relative pivotal movement between the hinge members 62, 64. The hinge assembly 60 includes a hold-open support assembly, generally designated 68, which comprises an elongated link 70 pivotally secured at one end to the hinge member 64 and movable therewith. The link 70 has a slot 72 provided therein having a first portion 74 extending away from the hinge member 64 and a second portion 76 remote from the hinge member 64, which remote portion 76 intersects the first portion 74 at an angle. A stop pin 78 is mounted to the hinge member 62 and received within the slot 72 in the link 70. Consequently, the relative location of the stop pin 78 within the slot 72 changes as a result of pivotal movement of the hood 26. When the hood 26 is raised, as shown in FIG. 3, the pin 78 moves into the second portion 76 of the slot 70. As a result of engagement between the pin 78 and the link 70, the link 70 supports the hood 26 in the open position.

Industrial Applicability

As mentioned above, the particular shape of the support towers 18, 20 permits the support towers 18,20 to better conform to the shape of the panel structure 22, 24. As a result, the towers 18, 20 better support the panel structure 22, 24. In addition, the hold-open assembly 68 permits the hood 26 to be releasably held in the open position when access to the engine or other components is needed.

Although the presently preferred embodiments of this invention have been described, it will be understood that within the purview of the invention various changes may be made within the scope of the following claims.

I claim:

1. In a work machine comprising a frame having an end, first and second opposed side margins, and a longitudinal axis, an engine enclosure comprising:

an upstanding firewall mounted to said frame and having first and second opposed side margins;

a first support tower having a first, upstanding portion and a second substantially longitudinally-extending portion, said first portion of said first support tower being mounted to said frame at a location spaced longitudinally from said firewall and laterally inwardly from the first side margin of said firewall and said second portion of said first support tower being mounted to said firewall at an elevated location adjacent the first side margin of said firewall, said first and second portions of said first support tower being joined by an intermediate portion which extends upwardly and laterally outwardly from the first portion of said first support tower to the second portion of said first support tower;

a second support tower having a first, upstanding portion and a second substantially longitudinally-extending portion, said first portion of said second support tower being mounted to said frame at a location spaced longitudinally from said firewall and laterally inwardly from the second side margin of said firewall and said second portion of said second support tower being mounted to said firewall at an elevated location adjacent the second side margin of said firewall, said first and second portions of said second support tower being joined by an intermediate portion which extends upwardly and laterally outwardly from the first portion of said second support tower to the second portion of said second support tower;

first panel structure mounted to said first support tower;

second panel structure mounted to said second support tower; and a hood mounted to said firewall and extending between said first and second panel structures.

2. The engine enclosure of claim 1 wherein each of said support towers comprises a tubular member.

3. The engine enclosure of claim 2 wherein each of said support towers comprises a unitary tubular member.

4. The engine enclosure of claim 1 wherein said intermediate portion of each of said support members is joined to its respective first and second portions thereof by arcuate corner portions.

5. The engine enclosure of claim 1 further comprising a hinge assembly mounting said hood to said firewall such that said hood is pivotal between an open position and a closed position.

6. The engine enclosure of claim 5 wherein said hinge assembly includes hold-open support assembly adapted to releasably hold said hood in said open position.

7. The engine enclosure of claim 6 wherein said hinge assembly comprises a first hinge member secured to said firewall and a second hinge member pivotal relative to said first member and secured to said hood, and wherein said support assembly comprises:

an elongated link pivotally secured at one end to said second hinge member and movable therewith, said link having a slot provided therein having a first portion extending away from said second hinge member and a second portion remote from said second hinge member intersecting said first portion at an angle; and a stop member fixed in relation to said link and received within said slot such that the relative location of said stop member within said slot changes as a result of pivotal movement of said hood and thereby said second hinge member, interference between said link and said stop member, when in said second portion of said slot, preventing downward pivotal movement of said hood.

\* \* \* \* \*